US006988427B2

(12) United States Patent
Yamanaka

(10) Patent No.: US 6,988,427 B2
(45) Date of Patent: Jan. 24, 2006

(54) SEAL ASSEMBLY FOR A BICYCLE BOTTOM BRACKET

(75) Inventor: Masahiro Yamanaka, Izumisano (JP)

(73) Assignee: Shimano, Inc., Sakai (JP)

( * ) Notice: Subject to any disclaimer, the term of this patent is extended or adjusted under 35 U.S.C. 154(b) by 0 days.

(21) Appl. No.: 10/002,256

(22) Filed: Nov. 23, 2001

(65) Prior Publication Data

US 2003/0097900 A1    May 29, 2003

(51) Int. Cl.
G05G 1/14    (2006.01)
(52) U.S. Cl. .................... 74/594.1; 384/545
(58) Field of Classification Search .............. 74/594.1, 74/551.1, 551.2, 551.8; 384/489, 486, 485, 384/484, 545
See application file for complete search history.

(56) References Cited

U.S. PATENT DOCUMENTS

| 510,620 | A | | 12/1893 | Smith | |
| 626,227 | A | | 6/1899 | Gaylor | |
| 648,077 | A | | 4/1900 | Ludlow | |
| 2,083,092 | A | | 6/1937 | Richer | |
| 3,529,508 | A | | 9/1970 | Cooksey | |
| 3,578,829 | A | * | 5/1971 | Hata et al. | 384/458 |
| 4,300,411 | A | | 11/1981 | Segawa | |
| 4,331,043 | A | | 5/1982 | Shimano | |
| 4,358,967 | A | | 11/1982 | Kastan | |
| 4,371,176 | A | * | 2/1983 | Shimano | 384/480 |
| 4,418,584 | A | | 12/1983 | Shimano | |
| 4,522,610 | A | | 6/1985 | Nagano | |
| 4,550,927 | A | * | 11/1985 | Resele | 280/281.1 |
| 4,606,658 | A | * | 8/1986 | Hofmann et al. | 384/510 |
| 4,704,919 | A | | 11/1987 | Durham | 74/594.1 |
| 4,728,218 | A | | 3/1988 | Durham | 403/319 |
| 5,010,785 | A | | 4/1991 | Romero | 74/594.1 |
| 5,118,205 | A | * | 6/1992 | Hoffmann | 384/458 |
| 5,209,581 | A | * | 5/1993 | Nagano | 384/545 |
| 5,233,885 | A | * | 8/1993 | Lin et al. | 74/594.1 |
| 5,328,196 | A | * | 7/1994 | Ohma | 280/276 |
| 5,330,220 | A | * | 7/1994 | Nagano | 280/279 |
| 5,476,327 | A | * | 12/1995 | Chiang | 384/545 |
| 5,493,937 | A | | 2/1996 | Edwards | 74/594.1 |
| 5,494,390 | A | | 2/1996 | Gonzales | |
| 5,496,114 | A | * | 3/1996 | Lin | 384/458 |
| 5,509,739 | A | | 4/1996 | Chi | |
| 5,531,510 | A | * | 7/1996 | Yamane | 301/110.5 |
| 5,549,396 | A | | 8/1996 | Chiang | |
| 5,572,909 | A | * | 11/1996 | Chi | 74/594.1 |
| 5,575,540 | A | * | 11/1996 | Chi | 301/110.5 |
| 5,597,169 | A | * | 1/1997 | Bradbury | 280/276 |
| 5,597,242 | A | * | 1/1997 | Beeler | 384/517 |
| 5,709,283 | A | * | 1/1998 | Nief | 180/428 |
| 5,762,426 | A | * | 6/1998 | Lin | 384/458 |

(Continued)

FOREIGN PATENT DOCUMENTS

CH    211159    8/1940

(Continued)

Primary Examiner—Chong H. Kim
(74) Attorney, Agent, or Firm—James A. Deland

(57) ABSTRACT

A seal assembly includes a support, an outer seal extending circumferentially around a radially outer surface of the support, and an inner seal extending circumferentially around a radially inner surface of the support. In a more specific embodiment, the support comprises an annular base member, an inner ledge extending from a radially inner side of the base member, and an outer ledge extending from a radially outer side of the base member. The inner seal is disposed at a radially inner edge of the base member opposite the inner tubular member, and the outer seal is disposed around an outer peripheral surface of the outer tubular member.

40 Claims, 4 Drawing Sheets

U.S. PATENT DOCUMENTS

| | | | |
|---|---|---|---|
| 5,868,048 A | 2/1999 | Cassutti et al. | |
| 5,907,980 A | 6/1999 | Yamanaka | |
| 5,909,931 A * | 6/1999 | Tabe | 301/110.5 |
| 5,971,415 A * | 10/1999 | Lin | 280/280 |
| 5,979,924 A | 11/1999 | D'Aluisio et al. | 280/261 |
| 5,980,116 A * | 11/1999 | Chiang | 384/545 |
| 6,095,691 A * | 8/2000 | Chiang | 384/458 |
| 6,109,636 A * | 8/2000 | Klein et al. | 280/284 |
| 6,120,049 A * | 9/2000 | Gonzalez et al. | 280/276 |
| 6,139,192 A * | 10/2000 | Chiang | 384/545 |
| 6,164,157 A * | 12/2000 | Chen | 74/594.1 |
| 6,199,449 B1 | 3/2001 | Harrington | |
| 6,276,234 B1 * | 8/2001 | Harrington | 74/594.3 |
| 6,309,028 B1 * | 10/2001 | Kanehisa et al. | 301/110.5 |
| 6,478,128 B2 * | 11/2002 | Taylor | 192/64 |
| 6,575,057 B1 | 6/2003 | Ploeger | |
| 6,829,965 B1 * | 12/2004 | Mombrinie | 74/594.2 |

FOREIGN PATENT DOCUMENTS

| | | | |
|---|---|---|---|
| DE | 61009 | | 8/1891 |
| DE | 64643 | | 12/1891 |
| DE | 3531030 | * | 3/1987 |
| DE | G 90 10 815.9 U1 | | 10/1990 |
| DE | G 90 14 394.9 U1 | | 1/1991 |
| DE | 298 12 208 U1 | | 12/1998 |
| DE | 19751879 A1 | | 5/1999 |
| DE | 19954432 A1 | | 5/2001 |
| EP | 485954 A1 | | 5/1992 |
| EP | 512149 A1 | | 11/1992 |
| EP | 513647 A1 | | 11/1992 |
| FR | 904975 | | 11/1945 |
| FR | 946276 | | 5/1949 |
| FR | 1001909 | | 2/1952 |
| FR | 1309208 | | 4/1963 |
| FR | 2192640 | | 2/1974 |
| FR | 2501615 A1 | | 9/1982 |
| FR | 2615160 A1 | | 11/1988 |
| GB | 549498 | | 11/1942 |
| GB | 2002089 A | | 2/1979 |
| JP | 02221771 A | * | 9/1990 |

* cited by examiner

SEAL ASSEMBLY FOR A BICYCLE BOTTOM BRACKET

BACKGROUND OF THE INVENTION

The present invention is directed to bicycles and, more particularly, to an adapter assembly for a bicycle bottom bracket.

A bicycle bottom bracket is a cylindrical tube portion of the bicycle frame used to rotatably mount the pedal assembly to the bicycle. The pedal assembly usually comprises right and left crank arms, each of which has a pedal attached to one end. The other end of each crank arm is attached to an axle that extends through the bottom bracket. A bearing assembly is disposed between the axle and the bottom bracket at each side of the bottom bracket for rotatably supporting the axle, and one or more front sprockets usually are attached to the right side crank arm for driving the bicycle chain.

The front sprocket(s) must be properly aligned with the rear sprocket(s) attached to the rear wheel so that the bicycle operates properly. Thus, the axle must be properly positioned laterally within the bottom bracket. To accomplish this, adapter members screw into the bottom bracket, and the axial positions of the adapter members are adjusted using spacers inserted between the adapter members and the side edges of the bottom bracket. If the bearing assemblies are mounted to the adapter members, then preferably some sealing mechanism is provided for preventing contaminants such as dust or water from entering the bearing assemblies. Known seals are only partially effective for that purpose.

SUMMARY OF THE INVENTION

The present invention is directed to a seal assembly for a bottom bracket which has superior sealing properties over known sealing mechanisms. In one embodiment of the present invention, a seal assembly includes a support, an outer seal extending circumferentially around a radially outer surface of the support, and an inner seal extending circumferentially around a radially inner surface of the support. In a more specific embodiment, the support comprises an annular base member, an inner ledge extending from a radially inner side of the base member, and an outer ledge extending from a radially outer side of the base member. In this embodiment the inner seal is disposed at a radially inner edge of the base member opposite the inner tubular member, and the outer seal is disposed around an outer peripheral surface of the outer tubular member.

In an embodiment of the present invention directed to an adapter assembly used to position an axle laterally within the bottom bracket, the adapter assembly includes a tubular adapter member having an inner peripheral surface, and a seal assembly. In this embodiment the seal assembly includes an annular base member, an outer seal extending circumferentially around a radially outer surface of the base member and contacting the adapter member, and an inner seal extending circumferentially around a radially inner surface of the base member. If desired, the seal assembly can have the other structural features noted above.

DETAILED DESCRIPTION OF THE EMBODIMENTS

Figure 1:
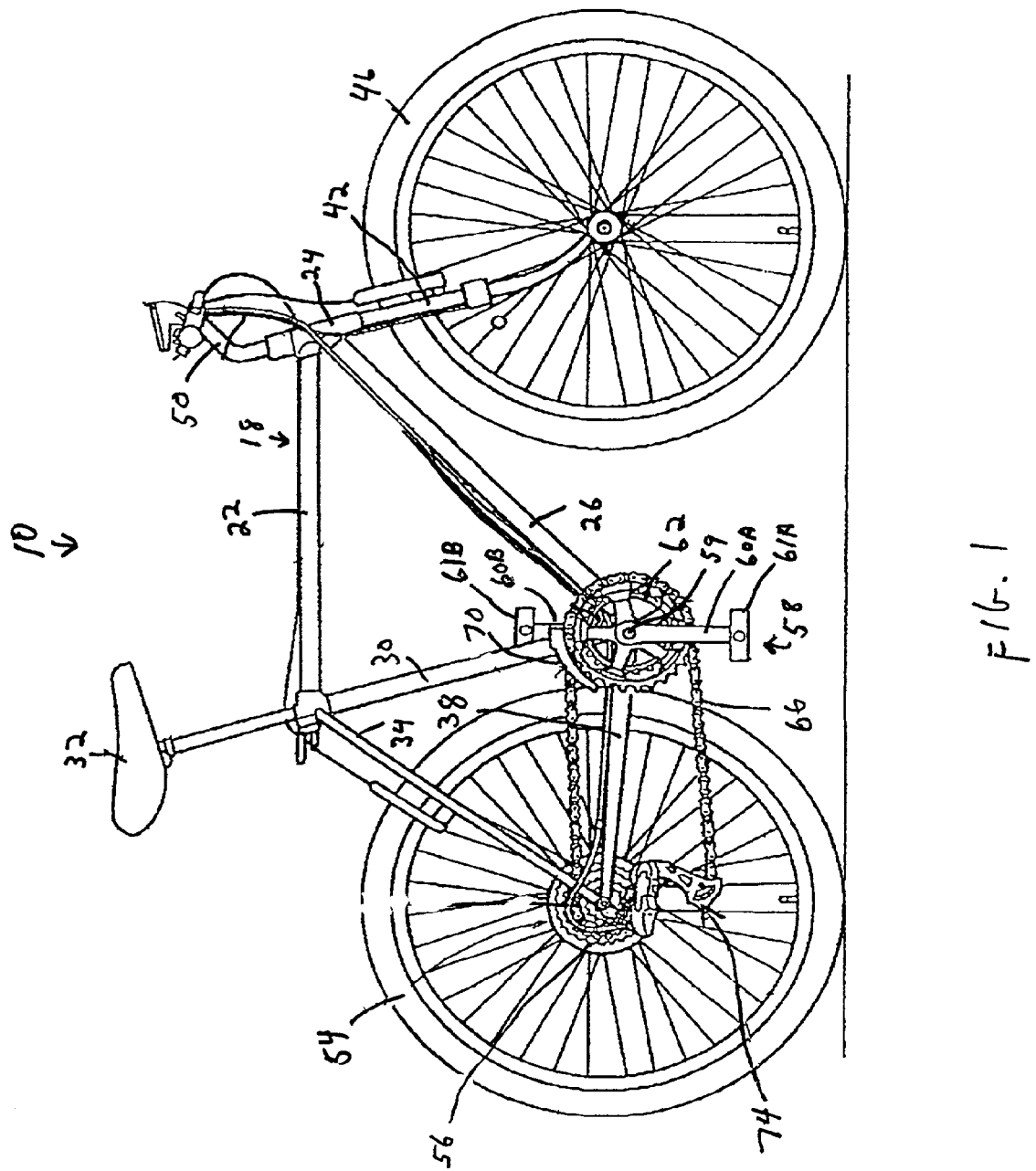
FIG. 1 is a side view of a bicycle that includes a particular embodiment of a seal assembly according to the present invention.

FIG. 1 is a side view of a bicycle 10 that incorporates a particular embodiment of a bottom bracket adapter assembly according to the present invention. Bicycle 10 may be any type of bicycle, and in this embodiment bicycle 10 includes a typical frame 18 comprising a top tube 22, a head tube 24, a down tube 26 extending downwardly from head tube 24, a seat tube 30 supporting a seat 32 and extending downwardly from top tube 22, a bottom bracket 33 (FIG. 3) disposed at the junction of down tube 26 and seat tube 30, a pair of seatstays 34 extending rearwardly and downwardly from top tube 22, and a pair of chainstays 38 extending rearwardly from bottom bracket 33. A fork 42 is rotatably supported within head tube 24, and a front wheel 46 is rotatably supported to the lower end of fork 42. Handlebars 50 control the rotational direction of fork 42 and front wheel 46 in a well-known manner. A rear wheel 54 having a plurality of coaxially mounted rear (freewheel) sprockets 56 is rotatably supported at the junction of seatstays 34 and chainstays 38, and a pedal assembly 58 supporting a plurality of front (chainwheel) sprockets 62 is rotatably supported within bottom bracket 33. Pedal assembly 58 includes an axle 59, a right side crank arm 60A attached to the right end of axle 59, a left side crank arm 60B attached to the left end of axle 59, and pedals 61A and 616 rotatably attached to the ends of crank arms 60A and 60B, respectively. Typically, two or three front sprockets 62 rotate coaxially and integrally with right side crank arm 60A. A chain 66 engages one of the plurality of front sprockets 62 and one of the plurality of rear sprockets 56. A front derailleur 70 moves chain 66 from one front sprocket 62 to another, and a rear derailleur 74 moves chain 66 from one rear sprocket 56 to another in accordance with shift commands from a rider in a known manner.

Figure 2:
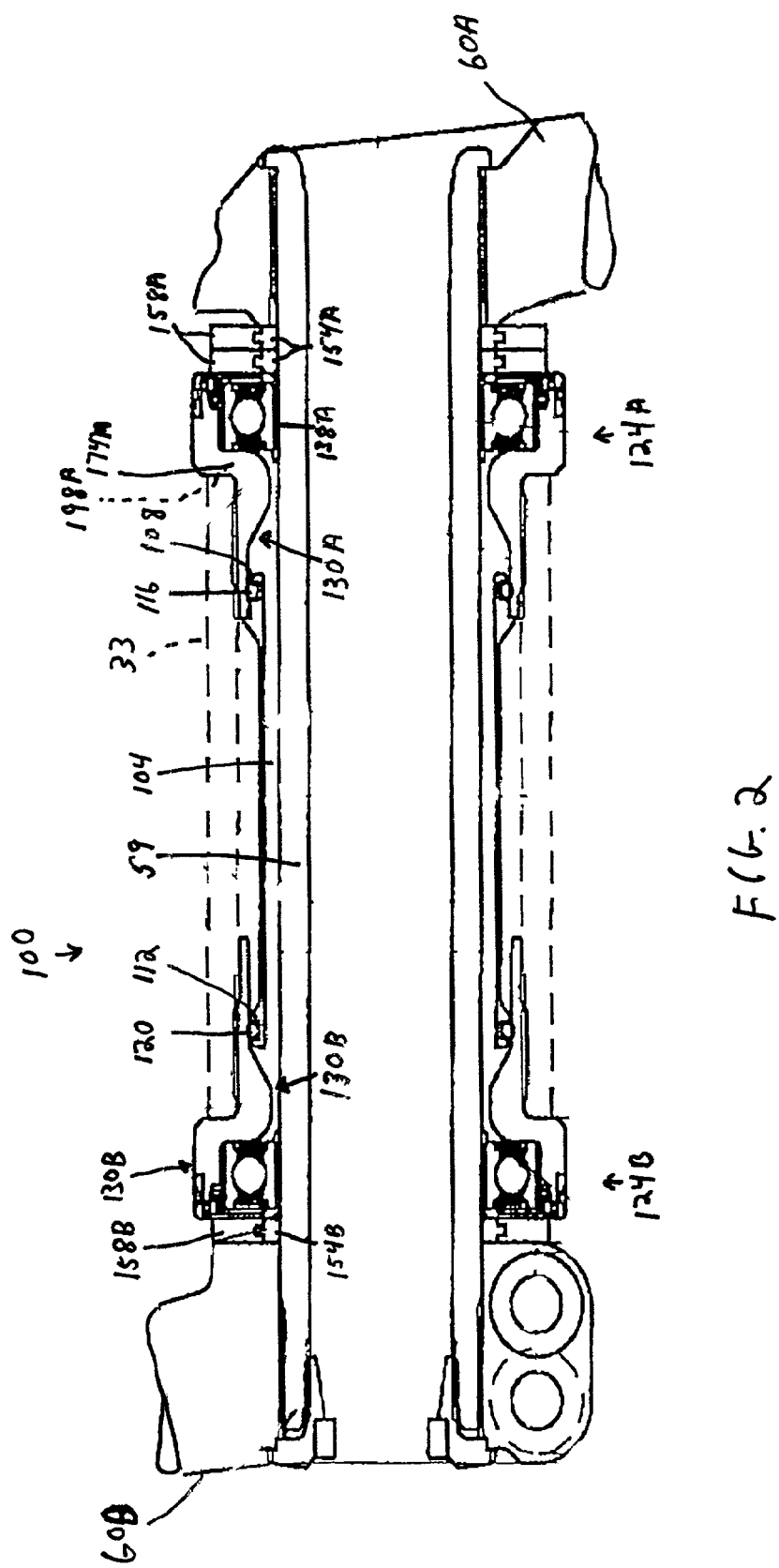
FIG. 2 is a rear cross-sectional view of a particular embodiment of a bottom bracket assembly according to the present invention.
Figure 3:
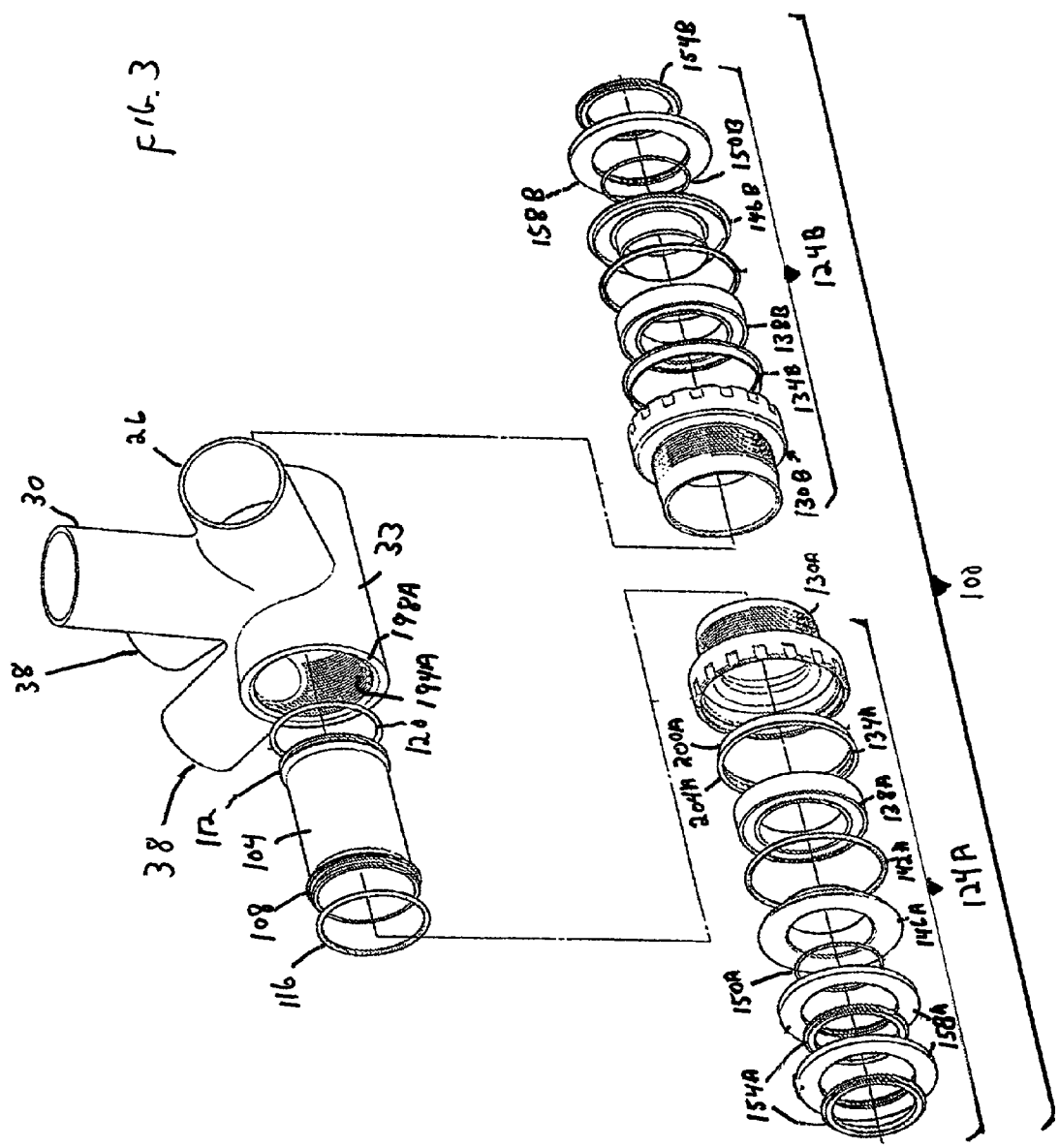
FIG. 3 is an exploded view of the bottom bracket assembly shown in FIG. 2.

FIG. 2 is a rear cross-sectional view of a particular embodiment of a bottom bracket assembly 100 according to the present invention, and FIG. 3 is an exploded view of bottom bracket assembly 100. As shown in those figures, bottom bracket assembly 100 comprises bottom bracket 33, a dust tube 104 disposed within bottom bracket 33, wherein dust tube 104 includes annular grooves 108 and 112 at the opposite ends thereof, O-ring seals 116 and 120 fitted within annular grooves 108 and 112, respectively, and adapter assemblies 124A and 124B fitted to the ends of bottom bracket 33 and dust tube 104. Adapter assemblies 124A and 124B are used to position axle 59 laterally within bottom bracket 33 so that front sprockets 62 are properly aligned with rear sprockets 56. Such positioning allows front and rear derailleurs 70 and 74 to operate chain 66 in a satisfactory manner.

Figure 4:
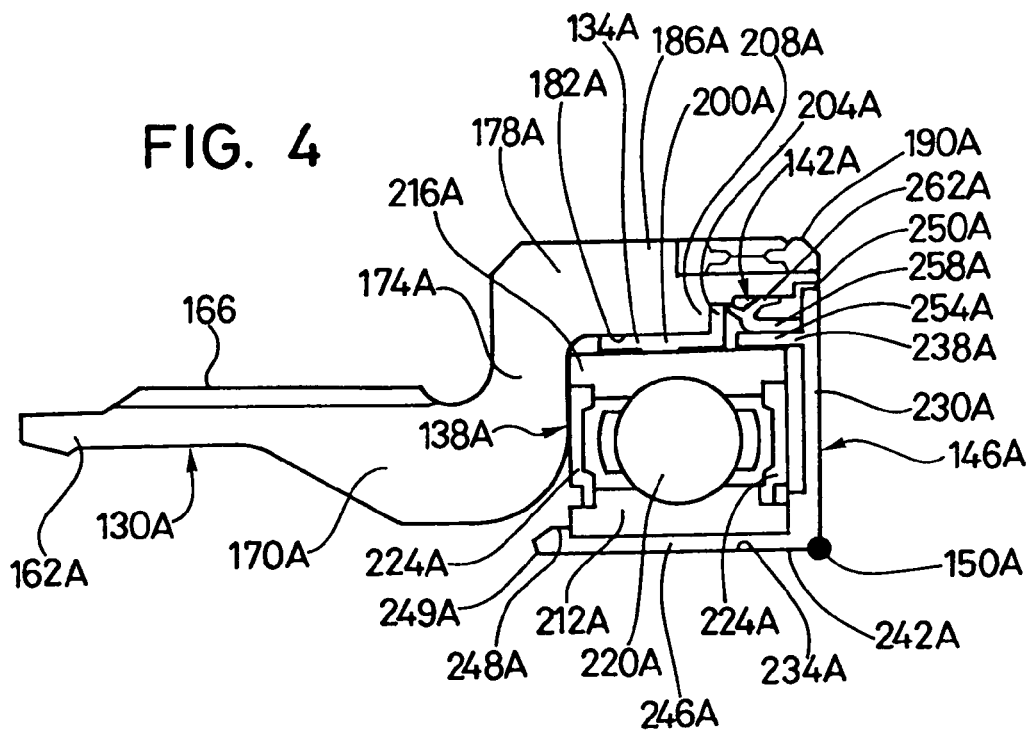
FIG. 4 is a more detailed view of the adapter assembly shown in FIG. 2.

As shown more clearly in FIGS. 3 and 4, in this embodiment adapter assembly 124A comprises an adapter member 130A, a bearing ring 134A, a bearing unit 138A, a seal ring 142A, a seal guard 146A, an O-ring 150A, two ring-shaped spacers 154A, and two soft urethane ring-shaped spacer covers 158A that fit around the outer peripheral surfaces of spacers 154A as shown in FIG. 2. Similarly, as shown in FIG. 3, adapter assembly 124B comprises an adapter member 130B, a bushing in the form of a bearing ring 134B, a bearing unit 138B, a seal ring 142B, a seal guard 146B, an O-ring 150B, one ring-shaped spacer 154B, and a soft urethane ring-shaped spacer cover 158B that fits around the outer peripheral surface of spacers 154B. Spacers 154A and 154B set the lateral position of axle 59 as shown in FIG. 2. In this embodiment there are two spacers 154A on the right side of bottom bracket assembly 100 and only one spacer on the left side of bottom bracket assembly 100. Thus, axle 59, crank arms 60A and 60B and sprockets 62 are shifted slightly to the right relative to bottom bracket 33.

The adapter assemblies 124A and 124B are constructed the same except for the number of spacers, and they operate in the same manner, so only the details of the components of adapter assembly 124A will be described in detail. As shown more clearly in FIG. 4, adapter member 130A comprises a smaller diameter tubular portion 162A having a threaded outer peripheral surface 166A and a thickened inner portion 170A, a radially outwardly extending side wall 174A, and a larger diameter portion 178A having an inner peripheral surface 182A and an outer peripheral surface 186A forming a tool engaging surface 190A. When adapter assembly 124A is in the assembled state, threaded outer peripheral surface 166A of smaller diameter portion 162A screws into a threaded inner peripheral surface 194A (FIG. 3) of bottom bracket 33 until side wall 174A of adapter member 130A abuts against a side edge 198A of bottom bracket 33 as shown in FIG. 2.

Bearing ring 134A comprises a tubular portion 200A and a radially outwardly extending side wall 204A. When adapter assembly 124A is in the assembled state, bearing ring 134A contacts the inner peripheral surface 182A of larger diameter portion 178A of adapter member 130A, and side wall 204A abuts against an abutment 208A formed on inner peripheral surface 182A. In this embodiment, bearing ring 134A is formed of a nonmetallic material such as POM plastic.

In this embodiment, bearing unit 138A is a conventional sealed bearing unit comprising an inner bearing race 212A, an outer bearing race 216A, a plurality of ball bearings 220A disposed between inner bearing race 212A and outer bearing race 216A, and annular side covers 224A. When adapter assembly 124A is in the assembled state, outer race 216A contacts bearing ring 134A. Since bearing ring 134A is formed of a nonmetallic material, squeaking and other undesirable noises caused by the contact between these two components are minimized or eliminated. Of course, bearing ring 134A could be formed of any material that suits the application or for cost reasons.

Seal guard 146A functions as a support for seal ring 142A and O-ring 150A, and it comprises an annular base member 230A, an inner tubular member 234A and an outer tubular member 238A. In this embodiment, seal guard 146A is formed of a nonmetallic material such as POM plastic. Inner tubular member 234A extends from a radially inner side surface of base member 230A and, in this embodiment, extends from a radially innermost edge 242A of base member 230A to form a radially inner peripheral surface or inner ledge 246A. When adapter assembly 124A is in the assembled state, inner ledge 246A contacts and supports inner bearing race 212A of bearing unit 138A. A protuberance 248A extends radially outwardly (approx. 0.1 mm in this embodiment) from the free edge 249A of inner tubular member 234A to lock bearing unit 138A in position on inner tubular member 234A. Since seal guard 146A is formed of a nonmetallic material, squeaking and other undesirable noises caused by the contact between these two components are minimized or eliminated. Of course, seal guard 146A could be formed of any material that suits the application or for cost reasons.

Outer tubular member 238A extends from a radially outer side surface of base member 230A and, in this embodiment, is spaced apart from a radially outermost edge 250A of base member 230A to form a radially outer peripheral surface or outer ledge 254A. When adapter assembly 124A is in the assembled state, outer ledge 254A contacts and supports seal ring 142A and the outer bearing race 216A of bearing unit 138A. Thus, bearing unit 138A is sandwiched between inner ledge 246A and outer ledge 254A. While inner tubular member 234A and outer tubular member 238A extend from the same side of base member 230A in this embodiment, it is not necessary for them to do so.

In this embodiment, seal ring 142A functions as an outer seal, and it is a generally L-shaped ring member having a base portion 258A and a radially outwardly extending lip portion 262A that forms an acute angle with base portion 258A. Base portion 258A contacts and is supported by outer ledge 254A, and lip portion 262A contacts the inner peripheral surface 128A of adapter member 130A. Of course, seal ring 142A may take many different forms, and there need not be direct contact between the components. O-ring 150A functions as an inner seal, and it is disposed at the radially inner edge 242A of base member 230A opposite inner tubular member 234A. When adapter assembly 124A is in the assembled state, O-ring 150A contacts axle 59. Seal ring 142A and O-ring 150A in combination prevent contaminants from entering the space containing bearing unit 138A more advantageously than prior art sealing structures.

Figure 5:
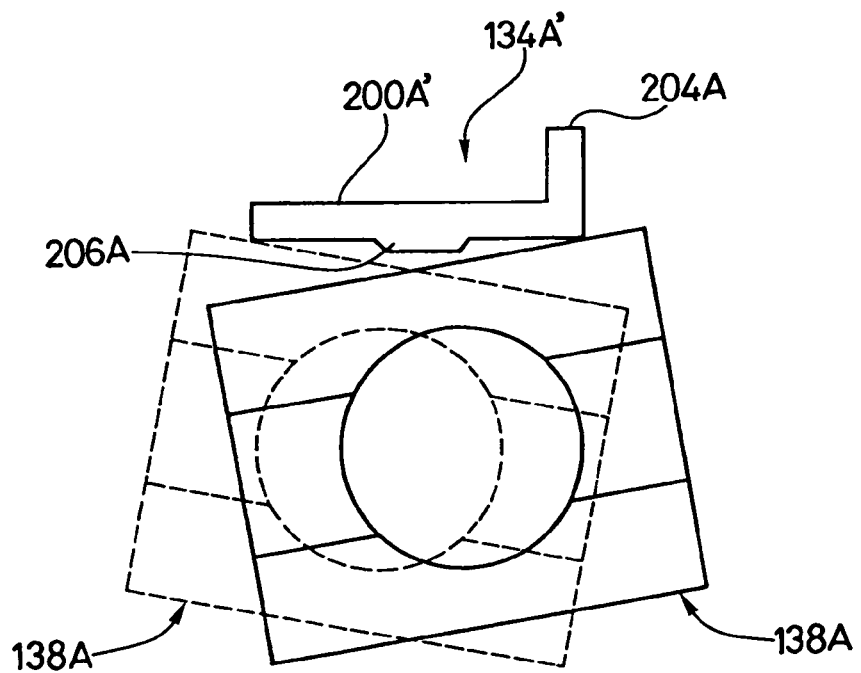
FIG. 5 is a cross sectional view of an alternative embodiment of the bushing shown in FIG. 4.

FIG. 5 is a detailed cross sectional view of a bearing ring 134A' that represents an alternative embodiment of the bearing ring 134A shown in FIG. 4. As with bearing ring 134A, bearing ring 134A' comprises a tubular portion 200A' and a radially outwardly extending side wall 204A'. However, in this embodiment a centrally disposed bushing protuberance 260A extends radially inwardly from tubular portion 200A for contacting outer bearing race 216A when adapter assembly 124A is in the assembled state. If bearing unit 138A is tilted for some reason as shown by the broken lines in FIG. 5, such as if bottom bracket 33 is bent as a result of a manufacturing defect or a collision, then bushing protuberance 260A accommodates such tilting. Although bushing protuberance 260A has a trapezoidal shape in this embodiment, it could have a spherical or other shape to perform the same function While the above is a description of various embodiments of the present invention, further modifications may be employed without departing from the spirit and scope of the present invention. For example, the size, shape, location or orientation of the various components may be changed as desired. Components that are shown directly connected or contacting each other may have intermediate structures disposed between them. The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A seal assembly dimensioned to fit within an adapter member for a bicycle bottom bracket containing an axle, wherein the seal assembly comprises:
   a support that includes a laterally inwardly facing surface, a laterally outwardly facing surface, a radially inner portion and a radially outer portion, wherein the laterally inwardly facing surface faces laterally inwardly relative to the bicycle when the seal assembly is mounted to the bicycle;
   an outer seal extending circumferentially around a radially outer surface of the support to prevent contaminants from entering past the outer seal into the adapter member;
   an inner seal extending circumferentially around a radially inner surface of the support to prevent contaminants from entering past the inner seal into the adapter member;
   wherein the outer seal and the inner seal are disposed on opposite lateral sides of the support; and
   wherein the support is dimensioned so that a space is formed between the radially outer portion of the support and an inner peripheral surface of the adapter member when the seal assembly is mounted to the bicycle so that the radially outer portion of the support faces the inner peripheral surface of the adapter member across the space.

2. The seal assembly according to claim 1 wherein the outer seal extends around an outer peripheral surface of the support.

3. The seal assembly according to claim 1 wherein the inner seal extends around an inner peripheral surface of the support.

4. The seal assembly according to claim 1 wherein the outer seal extends around an outer peripheral surface of the support, and wherein the inner seal extends around an inner peripheral surface of the support.

5. The seal assembly according to claim 4 wherein the support comprises a tubular member.

6. The seal assembly according to claim 1 wherein the support comprises an annular base member.

7. The seal assembly according to claim 6 wherein the inner seal is disposed at a radially inner edge of the base member.

8. The seal assembly according to claim 6 wherein the support further comprises an inner ledge extending from a radially inner side of the base member.

9. The seal assembly according to claim 8 wherein the inner ledge comprises an inner tubular member.

10. A seal assembly dimensioned to fit within an adapter member for a bicycle bottom bracket containing an axle, wherein the seal assembly comprises:
    a support that includes a laterally inwardly facing surface, a laterally outwardly facing surface, a radially inner portion and a radially outer portion, wherein the laterally inwardly facing surface faces laterally inwardly relative to the bicycle when the seal assembly is mounted to the bicycle;
    wherein the support comprises an annular base member with an inner tubular member forming an inner ledge extending from a radially inner side of the base member;
    an outer seal extending circumferentially around a radially outer surface of the support;
    an inner seal extending circumferentially around a radially inner surface of the support;
    wherein the outer seal and the inner seal are disposed on opposite lateral sides of the support; and
    wherein the inner tubular member includes a radially outwardly extending protuberance spaced apart from the base member.

11. The seal assembly according to claim 9 wherein the inner tubular member extends from a radially inner edge of the base member.

12. The seal assembly according to claim 11 wherein the inner seal is disposed at a radially inner edge of the base member opposite the inner tubular member.

13. The seal assembly according to claim 6 wherein the support further comprises an outer ledge extending from a radially outer side of the base member.

14. A seal assembly dimensioned to fit within an adapter member for a bicycle bottom bracket containing an axle, wherein the seal assembly comprises:
    a support that includes a laterally inwardly facing surface, a laterally outwardly facing surface, a radially inner portion and a radially outer portion, wherein the laterally inwardly facing surface faces laterally inwardly relative to the bicycle when the seal assembly is mounted to the bicycle;
    wherein the support comprises an annular base member with an outer ledge extending from a radially outer side thereof;
    an outer seal extending circumferentially around a radially outer surface of the support;
    an inner seal extending circumferentially around a radially inner surface of the support;
    wherein the outer seal and the inner seal are disposed on opposite lateral sides of the support; and
    wherein the outer ledge comprises an outer tubular member.

15. The seal assembly according to claim 14 wherein the outer seal is disposed around an outer peripheral surface of the outer tubular member.

16. The seal assembly according to claim 6 wherein the support further comprises:
    an inner ledge extending from a radially inner side of the base member; and
    an outer ledge extending from a radially outer side of the base member.

17. A seal assembly dimensioned to fit within an adapter member for a bicycle bottom bracket containing an axle, wherein the seal assembly comprises:
    a support that includes a laterally inwardly facing surface, a laterally outwardly facing surface, a radially inner portion and a radially outer portion, wherein the laterally inwardly facing surface faces laterally inwardly relative to the bicycle when the seal assembly is mounted to the bicycle;
    wherein the support comprises an annular base member with an inner ledge extending from a radially inner side thereof and an outer ledge extending from a radially outer side thereof;
    an outer seal extending circumferentially around a radially outer surface of the support;
    an inner seal extending circumferentially around a radially inner surface of the support;
    wherein the outer seal and the inner seal are disposed on opposite lateral sides of the support; and
    wherein the inner ledge comprises an inner tubular member, and wherein the outer ledge comprises an outer tubular member.

18. The seal assembly according to claim 17 wherein the inner tubular member includes a radially outwardly extending protuberance spaced apart from the base member.

19. The seal assembly according to claim 17 wherein the inner tubular member extends from a radially inner edge of the base member.

20. The seal assembly according to claim 19 wherein the inner seal is disposed at a radially inner edge of the base member opposite the inner tubular member, and wherein the outer seal is disposed around an outer peripheral surface of the outer tubular member.

21. The seal assembly according to claim 20 wherein the inner tubular member and the outer tubular member extend from a same side of the base member.

22. An adapter assembly for a bicycle bottom bracket comprising:
   a tubular adapter member having an inner peripheral surface;
   a seal assembly comprising:
      an annular base member;
      an outer seal extending circumferentially around a radially outer surface of the base member and contacting the adapter member to prevent contaminants from entering past the outer seal into the adapter member; and
      an inner seal extending circumferentially around a radially inner surface of the base member to prevent contaminants from entering past the inner seal into the adapter member; and
   wherein the seal assembly is dimensioned so that a space is formed between the radially outer surface of the base member and an inner peripheral surface of the adapter member when the seal assembly is mounted to the bicycle so that the radially outer surface of the base member faces the inner peripheral surface of the adapter member across the space.

23. An adapter assembly for a bicycle bottom bracket comprising:
   a tubular adapter member having an inner peripheral surface;
   a seal assembly comprising:
      an annular base member;
      an outer seal extending circumferentially around a radially outer surface of the base member and contacting the adapter member;
      an inner seal extending circumferentially around a radially inner surface of the base member;
      an inner ledge extending from a radially inner side of the base member; and
      an outer ledge extending from a radially outer side of the base member;
   wherein the outer seal is disposed between the outer ledge and the inner peripheral surface of the adapter member.

24. The adapter assembly according to claim 23 wherein the inner seal is disposed at a radially inner edge of the base member.

25. The adapter assembly according to claim 24 wherein the inner ledge includes a radially outwardly extending protuberance spaced apart from the base member.

26. The adapter assembly according to claim 24 further comprising a bushing disposed at the inner peripheral surface of the adapter member and facing the inner ledge.

27. The adapter assembly according to claim 26 wherein the bushing includes a radially inwardly extending bushing protuberance.

28. The adapter assembly according to claim 27 wherein the bushing protuberance is disposed at a central portion of the bushing.

29. The adapter assembly according to claim 24 wherein the inner ledge and the outer ledge extend from a same side of the base member.

30. The adapter assembly according to claim 29 wherein the inner ledge comprises an inner tubular member, and wherein the outer ledge comprises an outer tubular member.

31. The adapter assembly according to claim 30 further comprising an annular bushing disposed at the inner peripheral surface of the adapter member and facing the inner tubular member.

32. The adapter assembly according to claim 31 further comprising a bearing disposed between the bushing and the inner tubular member.

33. The adapter assembly according to claim 32 wherein the bearing comprises:
   an inner bearing race;
   an outer bearing race; and
   a plurality of ball bearings disposed between the inner bearing race and the outer bearing race.

34. The adapter assembly according to claim 33 wherein the bushing includes a radially inwardly extending bushing protuberance.

35. The adapter assembly according to claim 34 wherein the bushing protuberance is disposed at a central portion of the bushing.

36. The adapter assembly according to claim 33 wherein the bushing and the inner tubular member both are formed of a nonmetallic material.

37. The seal assembly according to claim 1 wherein the outer seal prevents contaminants from entering past a radially outer peripheral surface of the outer seal into the adapter member.

38. The seal assembly according to claim 1 wherein the inner seal prevents contaminants from entering past a radially inner peripheral surface of the inner seal into the adapter member.

39. The adapter assembly according to claim 22 wherein the outer seal prevents contaminants from entering past a radially outer peripheral surface of the outer seal into the adapter member.

40. The adapter assembly according to claim 22 wherein the inner seal prevents contaminants from entering past a radially inner peripheral surface of the inner seal into the adapter member.

* * * * *